(12) United States Patent
Jimenez

(10) Patent No.: US 8,408,228 B1
(45) Date of Patent: Apr. 2, 2013

(54) FLOW CONTROL VALVE FOR A BROKEN SPRINKLER

(76) Inventor: Felipe Ernesto Jimenez, Antioch, CA (US)

( * ) Notice: Subject to any disclaimer, the term of this patent is extended or adjusted under 35 U.S.C. 154(b) by 346 days.

(21) Appl. No.: 12/766,869

(22) Filed: Apr. 24, 2010

(51) Int. Cl.
*F16K 17/40* (2006.01)

(52) U.S. Cl. ............... 137/68.14; 137/498; 137/504; 137/519.5; 239/570

(58) Field of Classification Search ............... 137/68.14, 137/498, 504, 519.5; 239/570
See application file for complete search history.

(56) References Cited

U.S. PATENT DOCUMENTS

| | | | | |
|---|---|---|---|---|
| 2,969,084 | A * | 1/1961 | Raymond | 137/471 |
| 5,335,857 | A * | 8/1994 | Hagon | 239/204 |
| 6,000,632 | A * | 12/1999 | Wallace | 239/204 |
| 6,178,982 | B1 * | 1/2001 | Longstreth | 137/68.14 |
| 6,263,912 | B1 | 7/2001 | Brown et al. | |
| 2007/0095951 | A1 | 5/2007 | Eader | |

* cited by examiner

*Primary Examiner* — William McCalister

(57) ABSTRACT

A flow control device is comprised of a body/connector, a simplified sliding cord, a sealing device, and a stopper. The body/connector connects an overhead sprinkler to a supply line by means of male threaded ends. The body/connector is comprised of a wrench connector, which is located between the two male threaded ends, a guiding tube that sits on the top side of the body/connector with the assistance of the supporting ribs. The guiding tube guides the sliding cord up and down inside the flow control device and sprinkler. The sliding cord is made from a material that is flexible enough to bend inside the supply line and strong enough to return to its original straight shape. The stopper and the sealing device are connected to each other with the sliding cord. The sealing device sits against the sealing surface of the body/connector if the sprinkler head is missing. The stopper prevents the sealing device from making contact with the body/connector during normal operational conditions.

8 Claims, 8 Drawing Sheets

FLOW CONTROL VALVE FOR A BROKEN SPRINKLER

CROSS-REFERENCE TO RELATED APPLICATIONS

Not Applicable

FEDERALLY SPONSORED RESEARCHED

Not Applicable

SEQUENCE LISTING OR PROGRAM

Not Applicable

BACKGROUND

1. Field

This application relates to a fluid flow control device and in particular to a fluid flow control valve. The device will act as a check valve for the free flow of fluid from a broken sprinkler device.

2. Prior Art

Overhead irrigation systems, such as fire sprinklers or water sprinklers for outside usage, by nature are vulnerable to damage by outside forces. These irrigations systems are usually connected to an under ground supply line, by means of a riser/connector, extending them several inches out from the ground. The sprinkler head may or may not be movable. Usually the most susceptible part of the sprinkler to break is the sprinkler head, since it extends the farthest from the ground. During normal operational conditions the fluid will be forced out through the sprinkler head and it will create a fluid spray enlarging the area irrigated by the sprinkler. At the same time the sprinkler head will create a back pressure which allows the remaining sprinklers to perform in the same manner. When a sprinkler head or the entire sprinkler is broken, fluid is allowed to flow freely. As a result, it inhibits the irrigation system from performing properly.

Currently there are several flow control devices that attempt to stop the free flow of fluid from a broken sprinkler, but they have proven to be inadequate or too complicated, i.e. too many components.

Flow control devices that require springs are very unreliable and unpredictable since they require a constant fluid pressure along the supply line. If the pressure in the supply line is too small the device may not stop the free flow of fluid from a broken sprinkler. On the contrary, if the pressure is too high the device will close during normal operational conditions. Other devices will only stop the free flow of fluid from a broken sprinkler head, but if the sprinkler is broken from its base, the flow control device will not perform adequately and it will allow fluid to flow freely.

Further deficiencies with previous flow control devices include the premature shut off of the flow control device. This is due to the combination of air and water that is present in the supply line when the irrigation system is initially turned on.

Devices that are too complicated, i.e. too many components, are usually to costly, difficult to fabricate, and maintain. For example, flow control devices that require ball housings are fabricated with several components that have to be attached permanently. This process can be costly to fabricate and very difficult to repair if there is a malfunction with the ball housing or the ball. Another example is devices that require springs and or metal components. These components corrode over time due to their contact with the fluid in service and they require a great deal of maintenance which over time may not be cost effective. Further problems with the spring devices is that a wide range of springs need to be manufactured in order to accommodate to the different pressures that can be found in various irrigation systems, thus making these devices costly to fabricate.

SUMMARY

The flow control check valve for the free flow of fluid from a broken sprinkler is comprised of four main components: a body/connector, a sliding cord, a stopper, and a sealing device.

DRAWINGS

Figures

Figure 3:
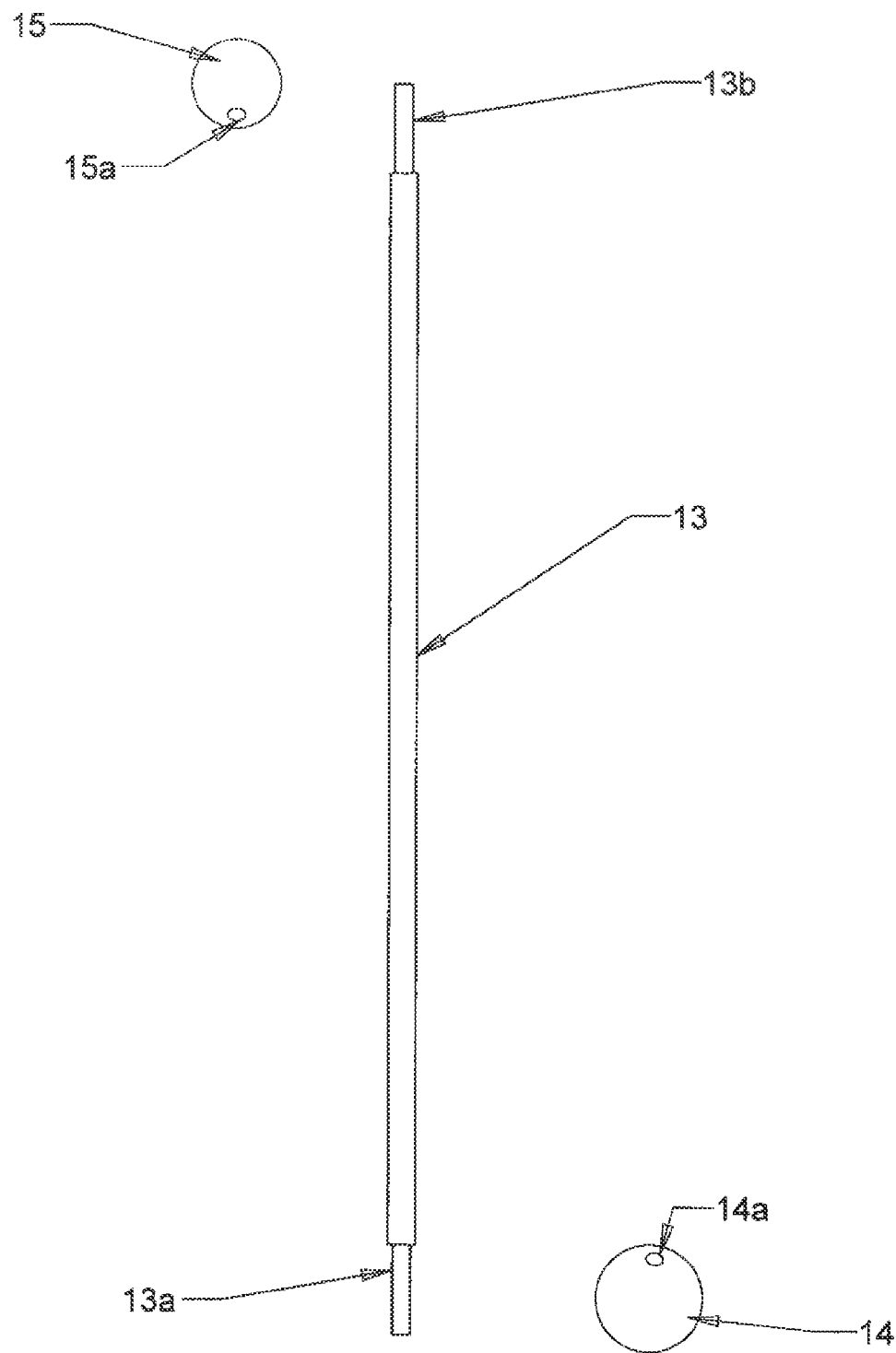

FIG. 3 illustrates the front view of the sliding cord 13 and the isometric views of both the sealing device 14 and stopper 15 prior to assembly.

Figure 4:
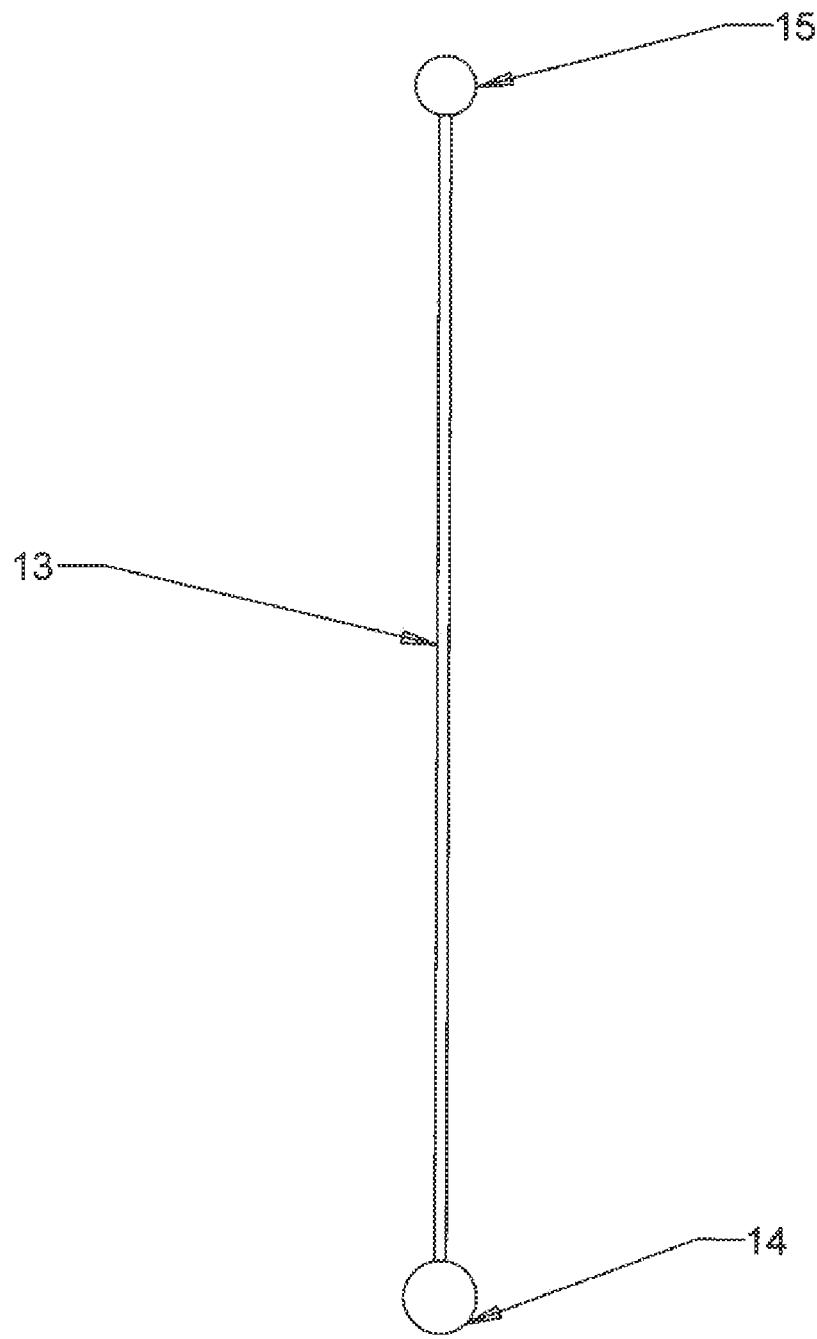

FIG. 4 illustrates the front view of the sliding cord 13 assembled with the sealing device 14 and stopper 15.

Figure 5:
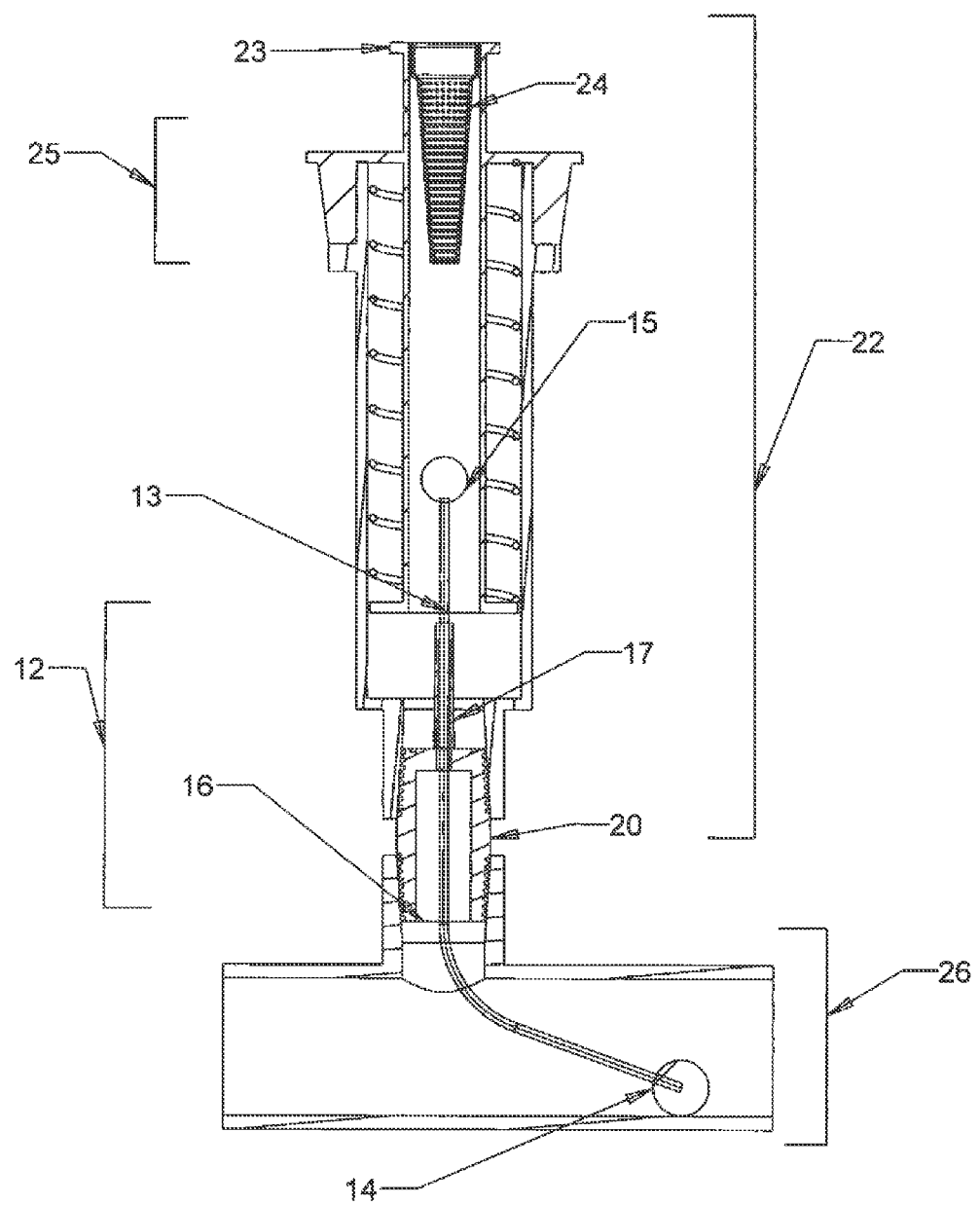

FIG. 5 illustrates a cross sectional front view of the check valve 11 with a "T" connector 26 and a sprinkler assembly 22 without flow.

Figure 6:
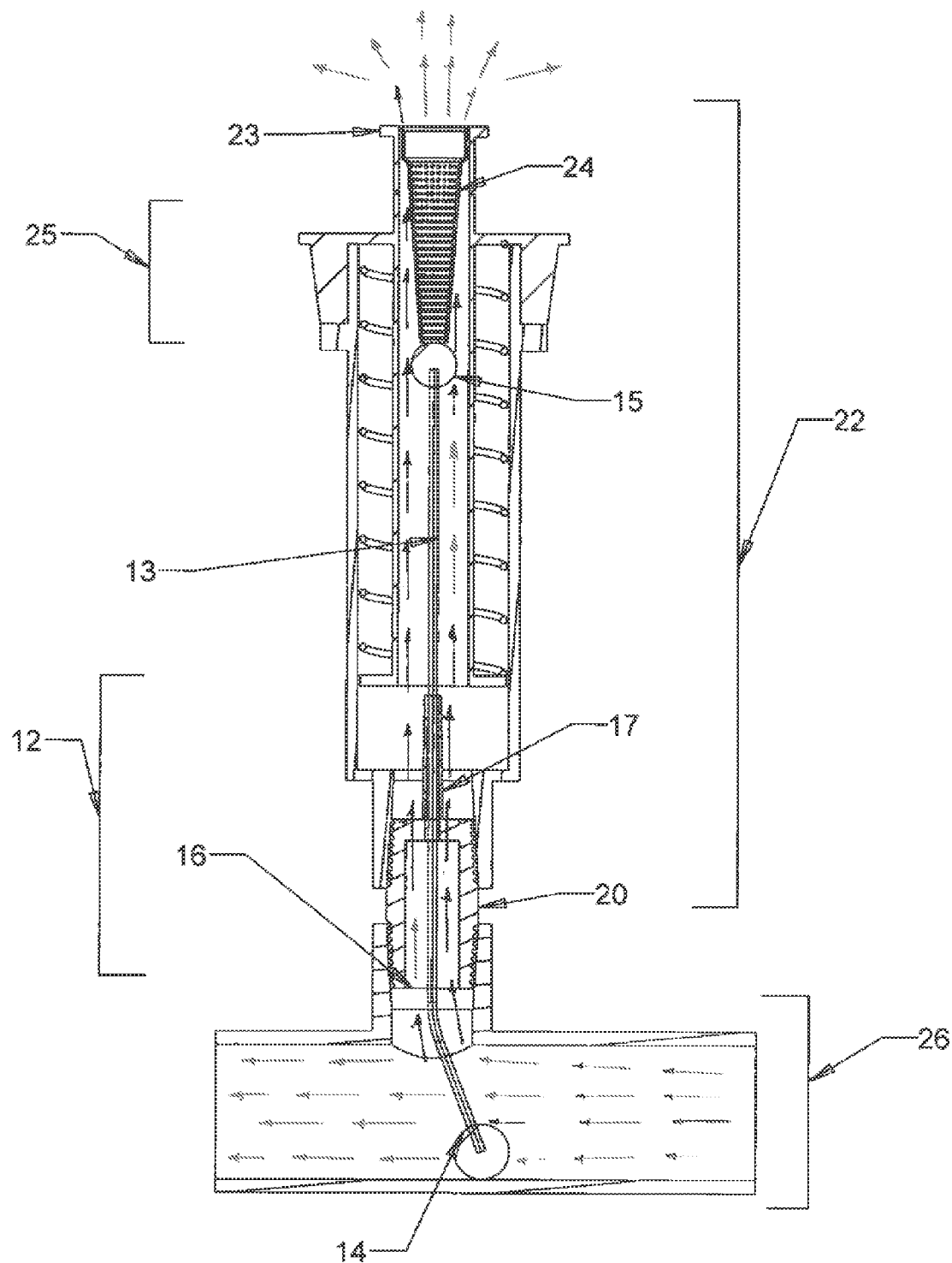

FIG. 6 illustrates a cross sectional view of the check valve 11 operating with a "T" connector 26, which is connected to a supply line (not shown), and the sprinkler assembly 22 during normal operational conditions.

Figure 7:
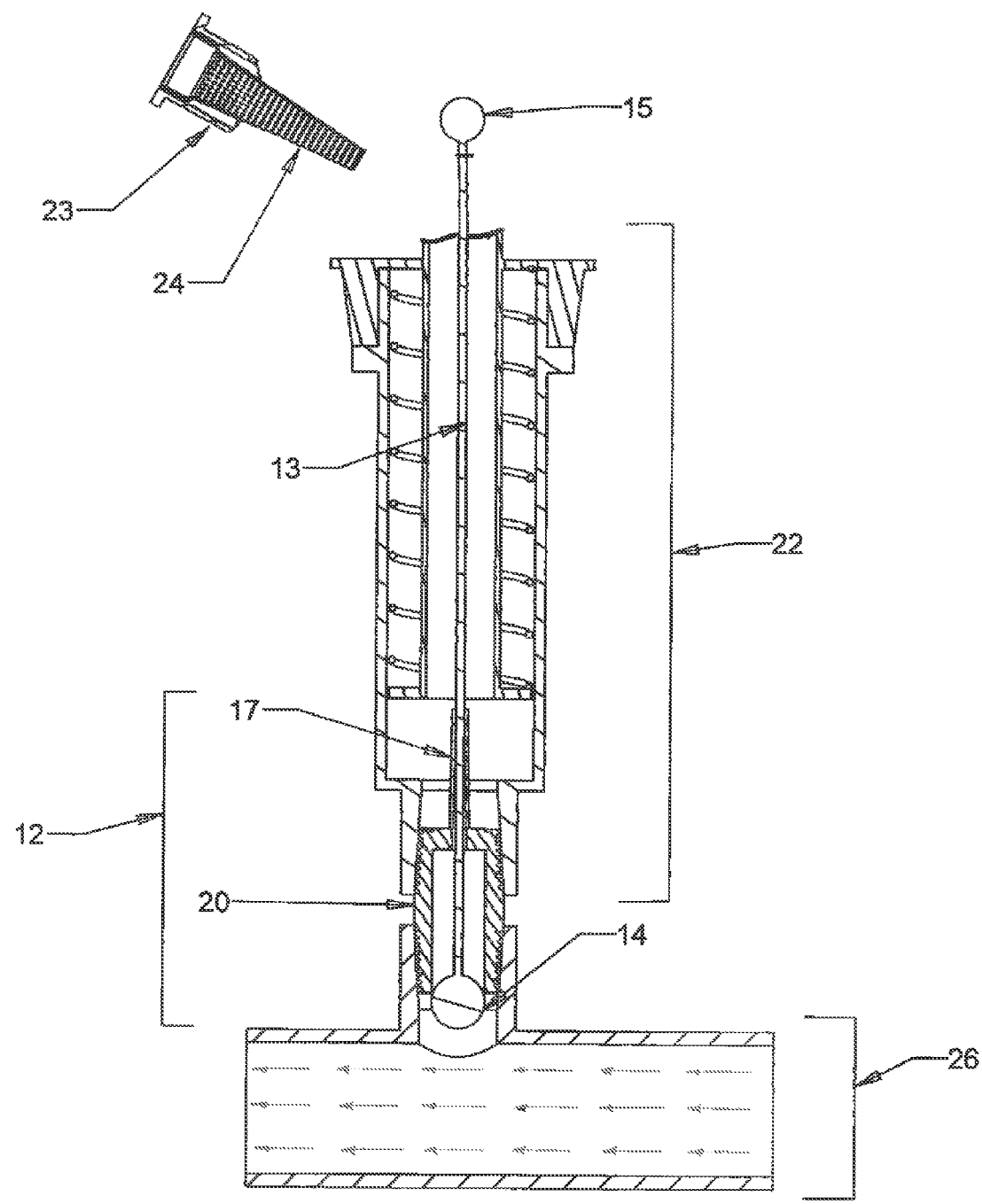

FIG. 7 illustrates a cross sectional view of the check valve 11 operating with a "T" connector 26, which is connected to a supply line (not shown), and the sprinkler assembly 22 during abnormal operational conditions.

Figure 8:
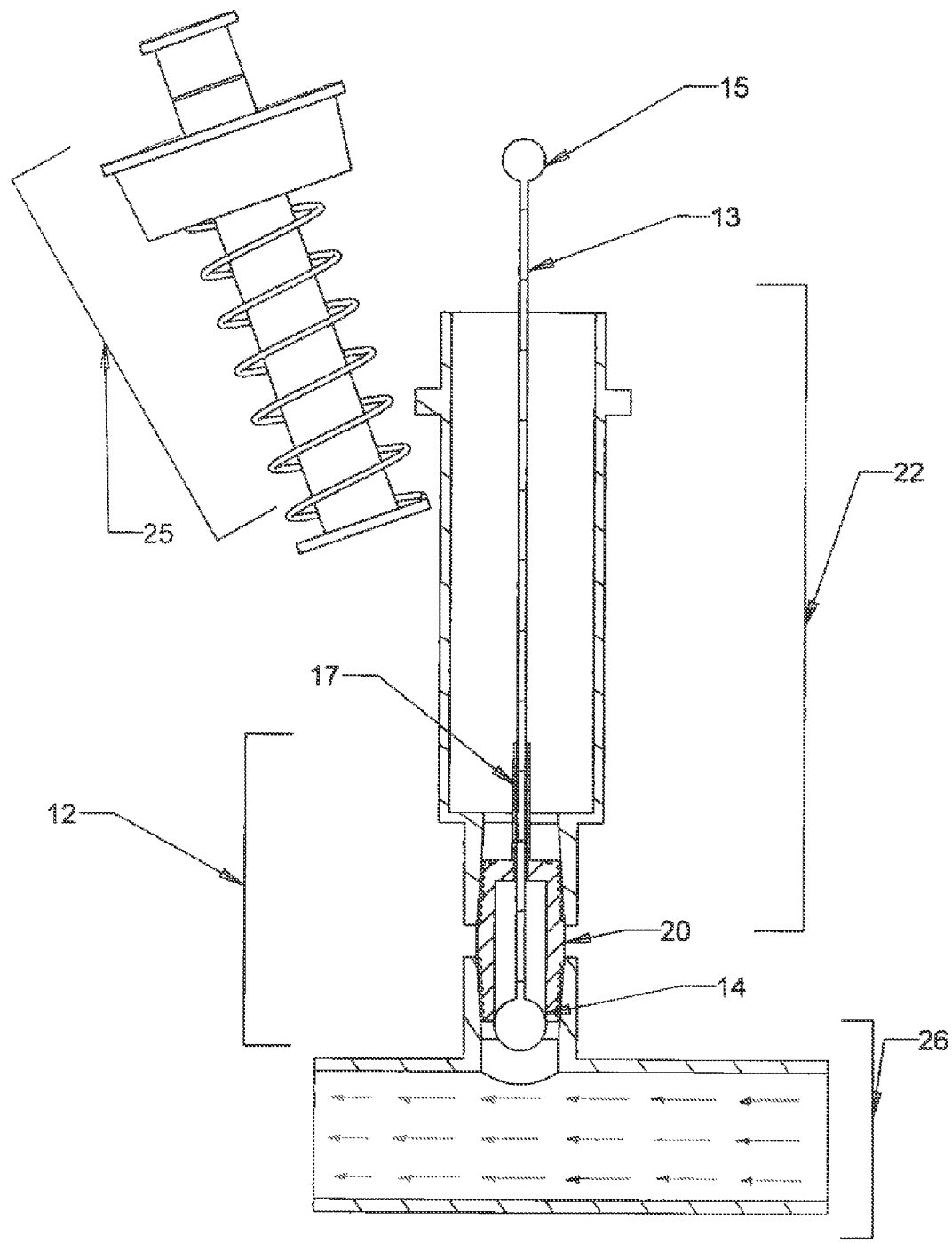

FIG. 8 illustrates a cross sectional view of the check valve 11 operating with a "T" connector 26, which is connected to a supply line (not shown), and the sprinkler assembly 22 during abnormal operational conditions.

| DRAWINGS - Reference Numerals | |
|---|---|
| 11. | Check Valve |
| 12. | Body/Connector |
| 13. | Sliding Cord |
| 13a. | Sliding Cord Recess |
| 13b. | Sliding Cord Recess |
| 14. | Sealing Device |
| 14a. | Sealing Device Hole |
| 15. | Stopper |
| 15a. | Stopper Hole |
| 16. | Sealing Surface |
| 17. | Guiding Tube |
| 18. | Supporting Ribs |
| 19. | Male National Pipe Thread (MNPT) |
| 20. | Wrench Connector |
| 21. | Inner Hole |
| 22. | Sprinkler Assembly |
| 23. | Sliding Head |
| 24. | Filter |
| 25. | Cap Assembly |
| 26. | "T" Connector |

DETAILED DESCRIPTION

FIG. 1-FIG. 8

Figure 1:
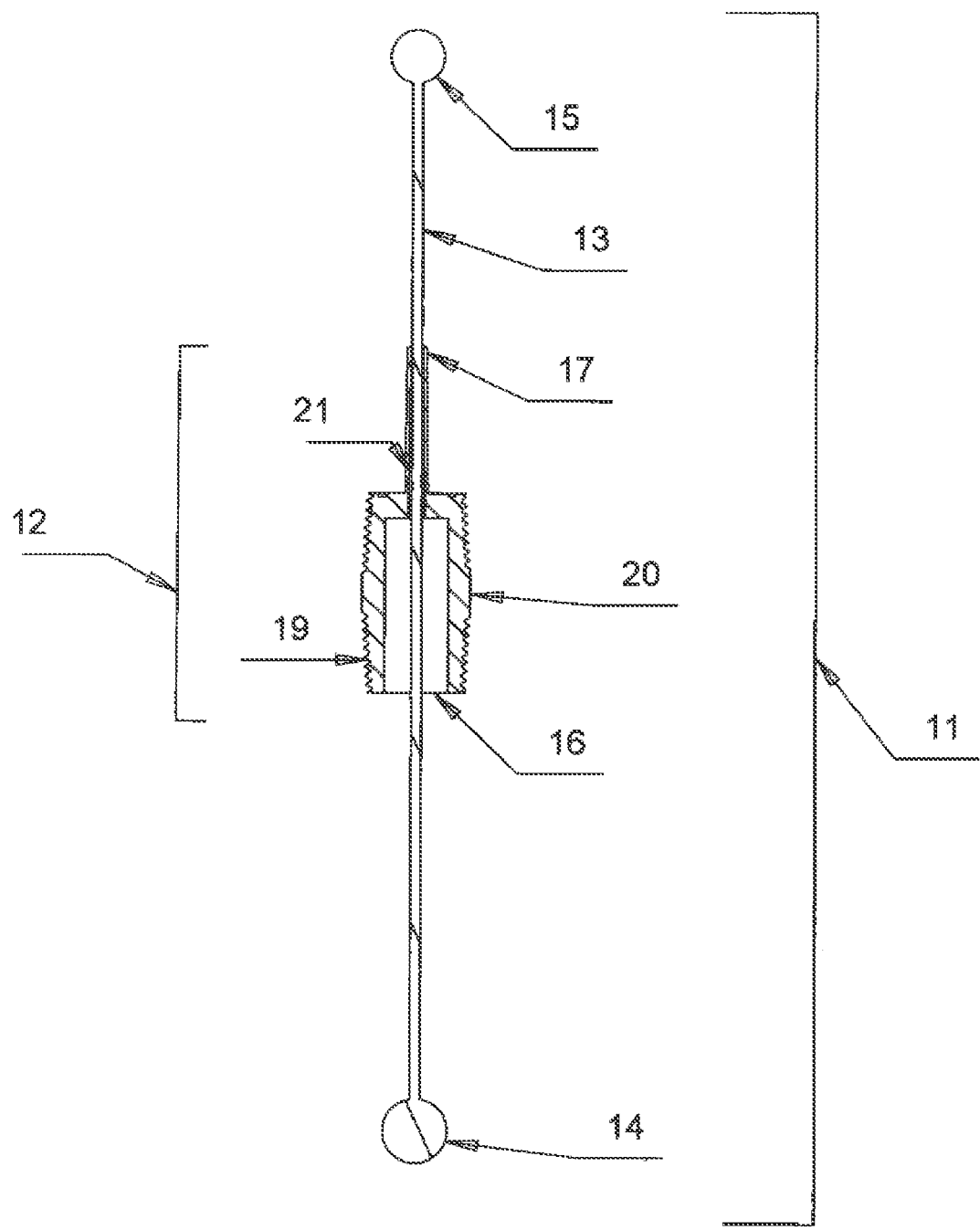
FIG. 1 illustrates a cross sectional view of the check valve 11.

FIG. 1 illustrates a cross-sectional view of the check valve 11, which will be used for controlling the flow of the fluid, such as water, in an overhead irrigation system. The check valve 11 is comprised of four main components: a body/connector 12, a sliding cord 13, a sealing device 14, and a stopper 15. All four components of the check valve 11 can be made of plastic. The body/connector 12 can be made from plastic materials such as ABS, polypropylene, and chlorinated polyvinyl chloride. Alternatively the body/connector 12 can be made from non-ferrous or ferrous materials such as aluminum, copper, brass and any other materials that will not react and deteriorate when coming into contact with the fluid. The sliding cord 13 can be made from nylon or a material that has the same mechanical properties as nylon, such as a steel cord. Nylon has a high point of elastic deformation, which allows the sliding cord 13 to return to its original "straight" position. The term "straight" is used to indicate that the sliding cord 13 will not permanently remain in a sharp bent position after being assembled with a "T" connector 26 (shown in FIG. 5) or an elbow connector (not shown). The sealing device 14 and the stopper 15 can be made from ABS, polypropylene, and chlorinated polyvinyl chloride. They can also be made from a non plastic material such as brass, aluminum, marble, etc. The material of both the sealing device 14 and the stopper 15 will be determined upon the application.

Figure 2:
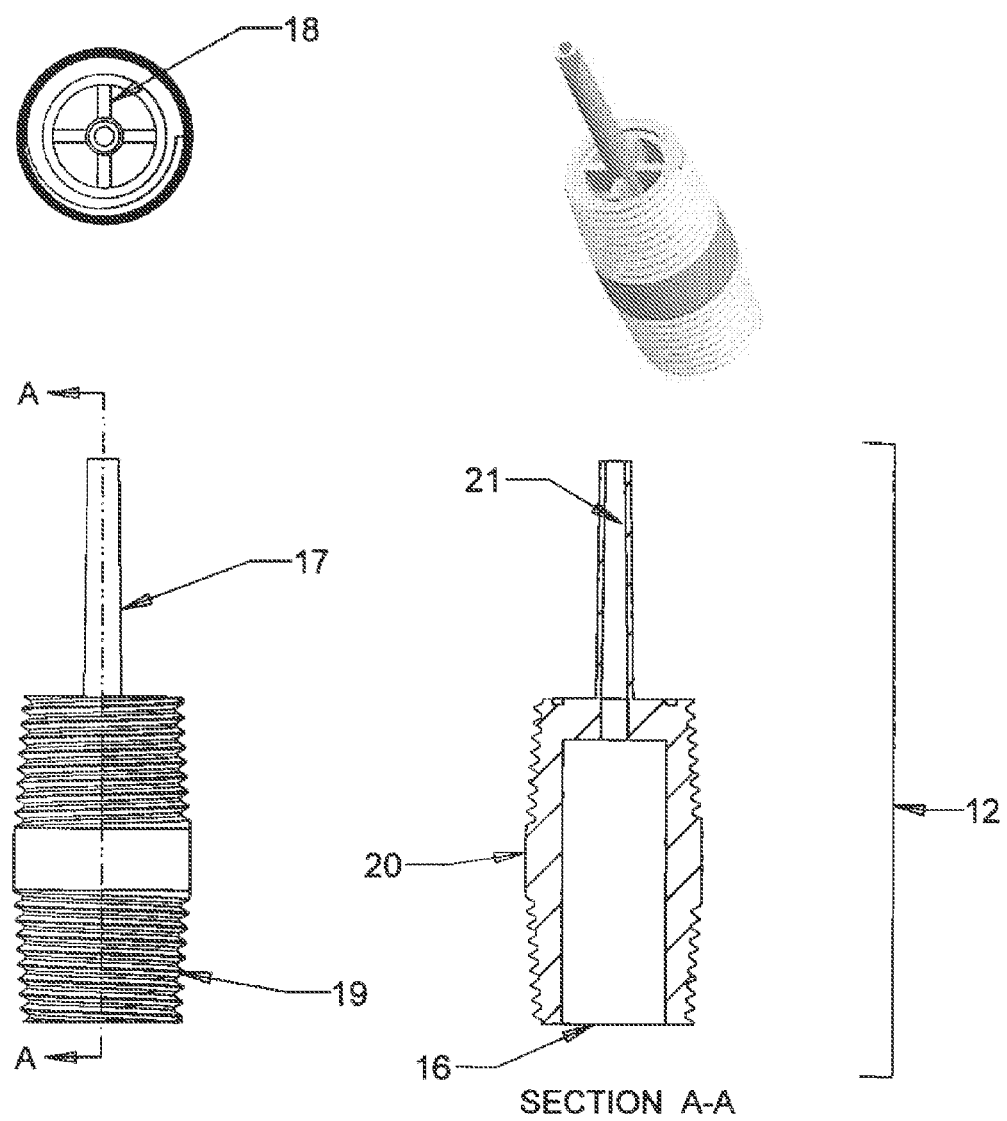
FIG. 2 illustrates three projections views (front, top, and right) and the isometric view of the check valve's body/connector 12.

FIG. 2 illustrates the three projection views (front, top, and right) and the isometric view of the check valve's body/connector 12. The body/connector 12 has three main functions:

The first function of the body/connector 12 is to connect the sprinkler assembly 22 (shown in FIG. 5, 6, 7, 8) to the supply line (not shown), by means of MNPT (Male National Pipe Thread) 19. The MNPT 19 creates a mechanical seal between each connection. The MNPT 19 size connections, for instance ½-14 MNPT, will determine the size and dimensions for the rest of the components of the check valve 11. The wrench connector 20 is shown as a solid diameter, which is the common configuration for nipples used to connect water sprinklers to the supply line (not shown). The wrench connector 20 can be manufactured with flat faces in order to facilitate the installation and removal of the check valve 11.

The second function of the body/connector 12 is to act as a guide for the sliding cord 13 to glide up and down the sprinkler assembly 22 (shown in FIG. 5, 6, 7, 8). This function is accomplished with the guiding tube 17 and the supporting ribs 18. The supporting ribs 18 allow the guiding tube 17 to stand in an upright position meanwhile allowing the fluid to go through the check valve 11 from the supply line (not shown) into the sprinkler assembly 22 during normal operational conditions. The inner hole 21 inside the guiding tube 17 is a conical shape, where the lower inside diameter is larger than the upper inside diameter. The upper inside diameter of the guiding tube 17 must be larger than the outside diameter of the sliding cord 13; therefore, allowing the sliding cord 13 to move freely inside the guiding tube 17.

It should be noted that the guiding tube 17, the supporting ribs 18, and the body/connector 12 can be manufactured as a solid piece. Alternatively, the guiding tube 17 and the supporting ribs 18 can be manufactured as one piece and attached together to the body/connector 12 during the assembly process. In both cases all three components shall be concentric to each other in order to guarantee stability and the proper performance of the check valve 11.

The third function of the body/connector 12 is to act as a check valve in conjunction with the sealing device 14, the sliding cord 13, and the stopper 15 for the free flow of fluid from a broken sprinkler assembly 22 (abnormal operational conditions). During abnormal operational conditions the sprinkler assembly 22 and the sealing device 14 will be forced into the sealing surface 16 of the body/connector 12. The inner diameter of the sealing surface 16 must be slightly smaller than the major diameter of the sealing device 14, for instance. –0.010". This will guarantee that the sealing device 14 will create a tight seal against the sealing surface 16; therefore, preventing the flow of any fluid to go through the body/connector 12 and into the sprinkler assembly 22 during abnormal operational conditions.

FIG. 3 shows a front view of the sliding cord 13 and the isometric views of the sealing device 14 and the stopper 15. Both the sealing device 14 and the stopper 15 will be manufactured with holes 14a and 15a respectively. The sealing device hole 14a and the stopper hole 15a will be attached to the sliding cord recess 13a and 13b respectively. In addition, the diameter of the stopper 15 could be smaller than the diameter of the sealing device 14, but it shall not be big enough to block any fluid from flowing freely out of the sprinkler assembly 22. The length of the sliding cord 13 is predetermined prior to the assembly of the checkvalve 11, which is determined by the length of the sprinkler assembly 22.

FIG. 4 shows the front views of the sliding cord 13, the sealing device 14, and the stopper 15 assembly. The sliding cord 13 and the stopper 15 can be manufactured as one solid piece. Both components shall be made from a bright color or painted with a bright color, i.e., red, yellow, neon green, etc. The use of bright colors in the sliding cord 13 and the stopper 15 will signal to a maintenance group or a home owner that there is a malfunction with the sprinkler assembly 22. As a result, the sprinkler assembly 22 will need to be replaced or repaired.

Another modification can be made to both the sealing device 14 and the stopper 15. Both can be manufactured as oval shapes lengthwise. However, the major diameter of the sealing device 14 and the stopper 15 will remain the same as they were in the initial design.

FIG. 5 illustrates a cross sectional front view of the check valve 11 with a "T" connector 26 and a sprinkler assembly 22 without fluid flow. The direction of the sealing device 14 should be in the opposite direction of the flow as shown in FIG. 5 and FIG. 6. However, it is not necessary.

FIG. 6 illustrates a cross sectional view of the check valve 11 operating with a "T" connector 26, which is connected to a supply line (not shown), and the sprinkler assembly 22 during normal operational conditions. The force of the fluid will push the stopper 15 against the filter 24 of the sprinkler assembly 22. Keep in mind that a filter 24 may or may not be present inside the sprinkler assembly 22. The filter 24 will act as a blocking device preventing the further movement of the stopper 15, thus preventing contact between the sealing device 14 and the sealing surface 16. It should be noted that if the sealing device 14 is assembled in the same direction as the fluid flow, the stopper 15 may or may not be resting against the filter 24.

The body/connector 12 is performing two of its main functions in FIG. 6. It connects the sprinkler assembly 22 to the supply line (not shown) and guides the sliding cord 13 up and down the sprinkler assembly 22 using the guiding tube 17 and the supporting ribs 18. During normal operational conditions, the fluid flow is allowed to move freely from the supply line (not shown) into the check valve 11 and into the sprinkler assembly 22. However, during abnormal operational conditions the check valve 11 will stop the free flow of fluid from a broken sprinkler assembly 22 as shown in FIG. 7 and FIG. 8.

FIG. 7 illustrates the performance of the check valve 11 in which the sliding head 23 of the sprinkler assembly 22 is broken. The force from the fluid flow will push the sliding head 23 and the filter 24 out of the sprinkler assembly 22. As a result, three different forces will act upon the sliding cord 13, the sealing device 14, and the stopper 15. The first force is created by the pressure differential across the sprinkler assembly 22, the second force is the fluid flow acting on the stopper 15, and the third force is the fluid acting upon the sealing device 14. Combined, all three forces will drive the stopper 15 and the sliding cord 13 out of the broken sprinkler assembly 22 while the sealing device 14 is forced into the sealing surface 16, thus preventing the free flow of fluid from the broken sprinkler assembly 22. Normal operational conditions will resume for the rest of the sprinkler devices in the irrigation system once the check valve 11 is in the closed position.

FIG. 8 illustrates the performance of the check valve 11 in the event that the cap assembly 25 of the sprinkler assembly 22 is broken off entirely. In this event the sliding head 23, the filter 24, the cap assembly 25, and the spring will be forced out of the sprinkler assembly 22. The check valve 11 will work in the same manner as described in FIG. 7. The sealing device 14 will be forced into the sealing surface 16 preventing the free flow of fluid from the broken sprinkler assembly 22 and thus resumes normal operational conditions for the rest of the sprinkler devices in the irrigation system.

It should be noted that if the sealing device 14 is originally assembled in the same direction of the fluid flow, the check valve 11 will perform in the same manner during abnormal operational conditions as mentioned before. When the sprinkler head 23 breaks the pressure downstream from the broken sprinkler assembly 22 will decrease considerably. As a result, any force created by the downstream pressure on the sealing device 14 be smaller than the combined forces created by the pressure differential across the broken sprinkler assembly 22 and the fluid force acting upon the stopper 15. Consequently, the sealing device 14 will be forced into the sealing surface 16 preventing the free flow of fluid from the broken sprinkler assembly 22 and will resume normal operational conditions for the rest of the sprinkler devices in the irrigation system.

A common sprinkler assembly 22 with a rising head is illustrated in FIG. 5-FIG. 8. However, the check valve 11 will function with any sprinkler device given that the sliding cord 13 length is properly sized for the length of each individual sprinkler and that the materials of the check valve 11 are compatible with the fluid in service.

I claim:

1. A flow control device for a sprinkler, comprising:
   a. a body/connector partially placed within said sprinkler with means for guiding a sliding cord and with a predetermined inner major diameter defined by a sealing surface,
   b. a sliding cord that connects a stopper and a sealing device, and said sliding cord, with the assistance of the flow from the fluid, glides freely up and down within the said body/connector and the sprinkler,
   c. said sealing device formed as a single spheroid shape member that cooperates with said sealing surface of said body/connector during abnormal operational conditions and said sealing device is directly attached to the lower end of said sliding cord,
   d. said stopper formed as a single spheroid shape member that is attached to the upper end of said sliding cord, whereby said stopper is in contact with the internal undersurface of said sprinkler head thus preventing said sealing device from sitting against said sealing surface of said body/connector during normal operational conditions.

2. Said flow control device from claim 1, wherein means of guiding said sliding cord comprises an elongated tube with a predetermined inner hole.

3. Said flow control device from claim 2, wherein said elongated tube is placed concentric and on top of said body/connector.

4. Said flow control device from claim 2, wherein said elongated tube is supported and held in place by a plurality of ribs.

5. Said flow control device from claim 4, wherein said plurality of ribs are attached to said inner major diameter of said body/connector.

6. Said flow control device from claim 1, wherein said sliding cord has the capability of bending inside a supply line and the capability of not remaining in a sharp bent position during abnormal operational conditions.

7. Said flow control device from claim 1, wherein said body/connector has a bottom male threaded end and an upper male threaded end, thereby connecting said sprinkler to a supply line of the fluid.

8. Said flow control device from claim 1, wherein said sealing surface is unitary with said body/connector.

\* \* \* \* \*